United States Patent
Suzuki et al.

(10) Patent No.: US 11,841,219 B2
(45) Date of Patent: Dec. 12, 2023

(54) TIRE SIDE DEVICE AND ROAD SURFACE CONDITION DETERMINATION DEVICE CONTAINING SAME

(71) Applicant: DENSO CORPORATION, Kariya (JP)

(72) Inventors: Youichiro Suzuki, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/682,724

(22) Filed: Feb. 28, 2022

(65) Prior Publication Data
US 2022/0178686 A1 Jun. 9, 2022

Related U.S. Application Data

(63) Continuation of application No. PCT/JP2020/033099, filed on Sep. 1, 2020.

(30) Foreign Application Priority Data

Sep. 4, 2019 (JP) .................................. 2019-161332

(51) Int. Cl.
*G01B 17/08* (2006.01)
*B60C 19/00* (2006.01)
(Continued)

(52) U.S. Cl.
CPC .............. *G01B 17/08* (2013.01); *B60C 19/00* (2013.01); *B60T 8/1725* (2013.01); *B60W 40/06* (2013.01); *B60C 2019/004* (2013.01)

(58) Field of Classification Search
CPC ...... G01B 17/08; B60W 40/06; B60F 8/1725; B60T 8/1725
See application file for complete search history.

(56) References Cited

U.S. PATENT DOCUMENTS

2016/0368501 A1 * 12/2016 Suzuki ............... B60W 40/068
2016/0368502 A1 * 12/2016 Suzuki ............... B60W 40/06
(Continued)

FOREIGN PATENT DOCUMENTS

JP 2018184101 A 11/2018
WO WO-2017221578 A1 12/2017

OTHER PUBLICATIONS

U.S. Appl. No. 17/682,873, filed Feb. 28, 2022, Suzuki et al.

*Primary Examiner* — Helen C Kwok
(74) *Attorney, Agent, or Firm* — Harness, Dickey & Pierce, P.L.C.

(57) ABSTRACT

A control unit of a tire side device has a feature amount extraction part, a feature amount storage part, a change determination part, a vehicle speed estimation part, and an algorithm switching part. The change determination part determines whether or not there is a change in the road surface condition based on a present feature amount and a previous feature amount stored in the feature amount storage part, and transmits a road surface data including the present feature amount when there is a change in the road surface condition. The algorithm switching part switches based on the vehicle speed estimation by the vehicle speed estimation part whether to transmit the road surface data from the transmission unit when the road surface condition is changed, or to transmit the road surface data without determining whether or not the road surface condition is changed by the change determination part.

13 Claims, 7 Drawing Sheets

(51) Int. Cl.
*B60T 8/172* (2006.01)
*B60W 40/06* (2012.01)

(56) References Cited

U.S. PATENT DOCUMENTS

2019/0047556 A1* 2/2019 Mori ..................... B60W 30/09
2019/0120721 A1* 4/2019 Suzuki .................. B60C 11/246
2020/0049497 A1* 2/2020 Suzuki ................. G06F 18/2411
2020/0317203 A1* 10/2020 Suzuki .................. B60W 40/06

* cited by examiner

TIRE SIDE DEVICE AND ROAD SURFACE CONDITION DETERMINATION DEVICE CONTAINING SAME

CROSS REFERENCE TO RELATED APPLICATIONS

This application is a continuation application of International Patent Application No. PCT/JP2020/033099 filed on Sep. 1, 2020, which designated the U.S. and based on and claims the benefits of priority of Japanese Patent Application No. 2019-161332 filed on Sep. 4, 2019. The entire disclosure of all of the above applications is incorporated herein by reference.

TECHNICAL FIELD

The present disclosure relates to a road surface condition determination device which detects vibration received by each of tires in tire side devices, produces road surface data representing a road surface condition based on vibration data, transmits the road surface data to a vehicle body side system, and determines the road surface condition based on the road surface data, and to a tire side device used for the road surface state determination device.

BACKGROUND

Conventionally, a tire device estimates a road surface condition.

SUMMARY

An object of the present disclosure is to provide a road surface condition determination device capable of realizing further power saving and a tire side device used therefor.

A tire side device according to one aspect of the present disclosure includes a vibration detection unit that outputs a detection signal according to a magnitude of a tire vibration, a control unit having a feature amount extraction part that extracts a feature amount of the detection signal during one rotation of the tire, and a transmission unit that transmits road surface data including the feature amount extracted by the feature amount extraction part.

The control unit includes
- a feature amount storage part configured to store the feature amount in the past extracted by the feature amount extraction part as a previous feature amount,
- a change determination part configured to determine whether or not there is a change in the road surface condition based on a present feature amount and the previous feature amount stored in the feature amount storage part, when the feature amount extracted at a time of a present rotation of the tire by the feature amount extraction part is referred to a present feature amount, and transmit the road surface data including the present feature amount by the transmission unit when there is a change in the road surface condition,
- a vehicle speed estimation part configured to estimate a vehicle speed of the vehicle, and
- an algorithm switching part configured to switch based on the vehicle speed estimated by the vehicle speed estimation part whether to transmit the road surface data from the transmission unit when the change determination part determines that the road surface condition is changed, or to transmit the road surface data without determining whether or not the road surface condition is changed by the change determination part.

DETAILED DESCRIPTION

Figure 1:
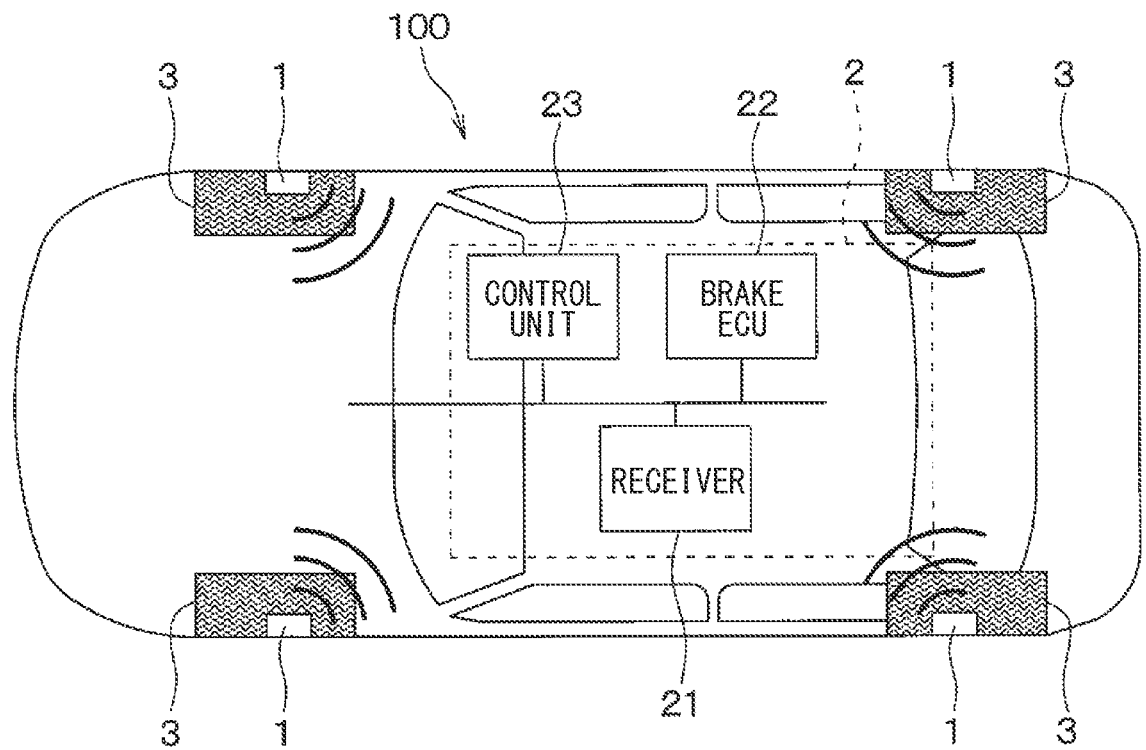
FIG. 1 is a schematic diagram illustrating a block configuration of a tire device to which a tire side device according to a first embodiment is applied in a state where the tire device is mounted in a vehicle.

In an assumable example, a tire device estimates a road surface condition. The tire device includes a tire side device having an acceleration acquisition unit on a back surface of a tire tread, and acquires a vibration applied to the tire in the acceleration acquisition unit and estimates the road surface condition by transmitting an acquisition result of the vibration to a vehicle body side system. The tire device estimates the road surface condition by generating data representing a road surface condition based on a vibration waveform of the tire detected in the acceleration acquisition unit and transmitting the data of each road wheel to a vehicle body side receiver and the like. Then, in order to achieve power saving of the tire side device, the tire device determines a change in the road surface condition, and transmits an acquisition result of the vibration applied to the tire from the tire side device to the vehicle body side system at a timing when the road surface condition is changed. That is, since the data transmission is performed only at the timing when the road surface condition for which it is desired to determine the road surface condition changes, communication is minimized and power saving is achieved.

However, in recent years, it has been confirmed that power saving of communication power has progressed, and that sufficient power saving may not be achieved by simply limiting data transmission to the timing when the road surface condition changes. An object of the present disclosure is to provide a road surface condition determination device capable of realizing further power saving and a tire side device used therefor.

A tire side device according to one aspect of the present disclosure includes a vibration detection unit that outputs a detection signal according to a magnitude of a tire vibration, a control unit having a feature amount extraction part that extracts a feature amount of the detection signal during one rotation of the tire, and a transmission unit that transmits road surface data including the feature amount extracted by the feature amount extraction part.

The control unit includes a feature amount storage part configured to store the feature amount in the past extracted by the feature amount extraction part as a previous feature amount, a change determination part configured to determine whether or not there is a change in the road surface condition based on a present feature amount and the previous feature amount stored in the feature amount storage part, when the feature amount extracted at a time of a present rotation of the tire by the feature amount extraction part is referred to a present feature amount, and transmit the road surface data including the present feature amount by the transmission unit when there is a change in the road surface condition, a vehicle speed estimation part configured to estimate a vehicle speed of the vehicle, and an algorithm switching part configured to switch based on the vehicle speed estimated by the vehicle speed estimation part whether to transmit the road surface data from the transmission unit when the change determination part determines that the road surface condition is changed, or to transmit the road surface data without determining whether or not the road surface condition is changed by the change determination part.

In this way, when it is determined by the change determination part that the road surface condition is changed based on the vehicle speed, the algorithm switching part switches whether to transmit the road surface data from the transmission unit or to transmit the road surface data without determining whether or not the road surface condition is changed by the change determination part. Therefore, if the road surface data is transmitted when the change determination part determines that the road surface condition is changed, the communication frequency can be reduced and the power saving of the control unit in the tire can be realized. Further, if it is not determined whether or not the road surface condition is changed, and the road surface data is transmitted every time the tire makes one or more rotations, the road surface data is frequently transmitted to the vehicle body side system and it is possible to save power compared to the case where the road surface data is transmitted only when the road surface condition changes. Therefore, it is possible to realize further power saving.

Hereinafter, embodiments of the present disclosure will be described with reference to the drawings. In the following embodiments, the same or equivalent parts are denoted by the same reference numerals.

First Embodiment

A tire device having a road surface condition discrimination function according to a present embodiment will be described. A tire device according to the present embodiment is configured to determine a road surface state during traveling based on vibration applied to a ground contact surface of a tire provided in each of road wheels of a vehicle, and also performs warning of danger of the vehicle, vehicle movement control and the like based on the determined road surface state. A part of the tire device, which performs a road surface state determination operates as a road surface state determination device.

Figure 2:
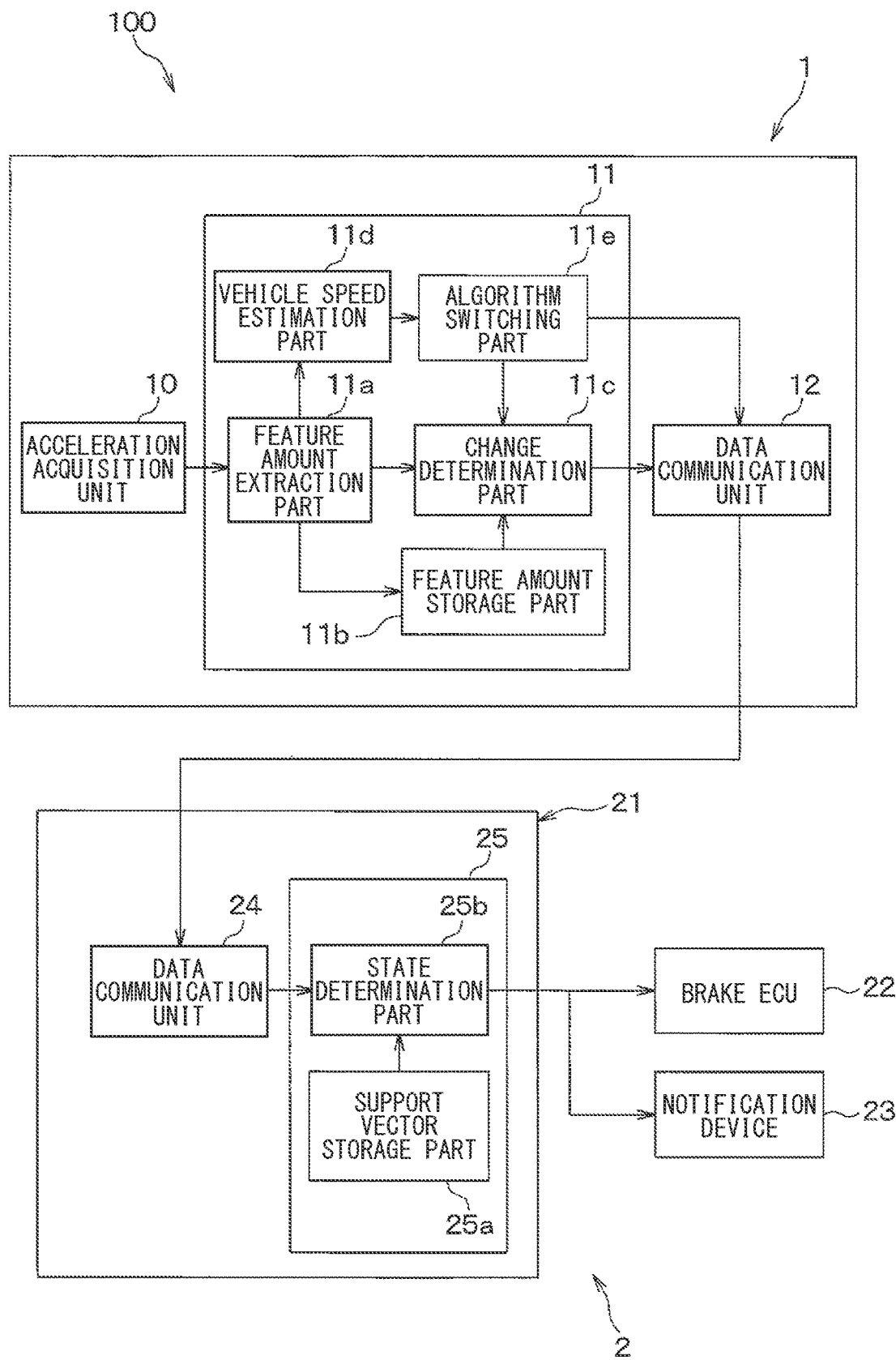
FIG. 2 is a block diagram showing respective details of a tire side device and a vehicle body side system.

As shown in FIGS. 1 and 2, a tire device 100 is configured to have a tire side device 1 provided on a wheel side and a vehicle body side system 2, which includes various parts provided on a vehicle body side. The vehicle body side system 2 includes a receiver 21, an electronic control unit 22 for brake control (hereinafter referred to as a brake ECU), a notification device 23 and the like.

The tire device 100 according to the present embodiment is configured to transmit data (hereinafter, referred to as road surface data) corresponding to the road surface state of a road on which the tire 3 is traveling from the tire side device 1, and receive the road surface data by the receiver 21 to determine the road surface state. In addition, the tire device 100 is configured to transmit a determination result of the road surface state determined by the receiver 21 to the notification device 23 and causes the notification device 23 to notify the determination result of the road surface state. It is thus made possible to notify a driver of the road surface state, for example, that the road surface is dry, wet or frozen. It is also made possible to warn the driver if the road surface is slippy. In addition, the tire device 100 is configured to perform a vehicle motion control for avoiding danger by transmitting the road surface state to the brake ECU 22 and the like that perform vehicle motion control. For example, when the road surface is frozen, a braking force generated with respect to a brake operation amount is weakened as compared with the case of a dry road, so that vehicle motion control corresponding to a low road surface p is performed. Specifically, the tire side device 1 and the receiver 21 are configured as follows.

Figure 3:
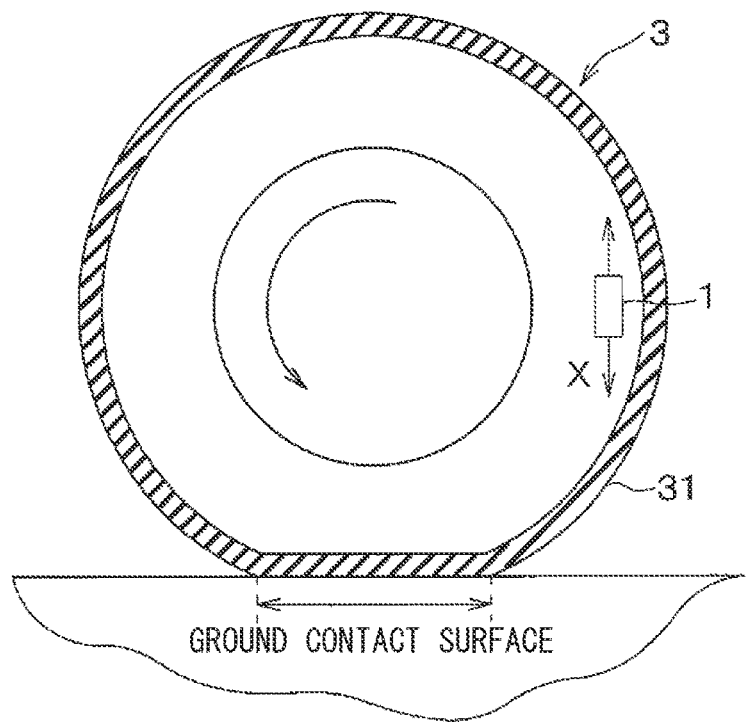
FIG. 3 is a schematic cross-sectional view of a tire to which a tire side device is attached.

As shown in FIG. 2, the tire side device 1 is configured to include an acceleration acquisition unit 10, a control unit 11, and a data communication unit 12, and as shown in FIG. 3, is provided on a back surface side of a tread 31 of the tire 3.

The acceleration acquisition unit 10 constitutes a vibration detection unit for detecting the vibration applied to the tire 3. For example, the acceleration acquisition unit 10 is composed of an acceleration sensor. In case that the acceleration acquisition unit 10 is the acceleration sensor, the acceleration acquisition unit 10 outputs a detection signal of acceleration as the detection signal, which corresponds to the vibration in a direction tangential to a circular trajectory drawn up by the tire side device 1 at the time of rotation of the tire 3, that is, a tire tangential direction indicated by an arrow X in FIG. 3 More specifically, the acceleration acquisition unit 10 generates, as a detection signal, an output voltage and the like in which one of the two directions indicated by the arrow X is positive and the opposite direction is negative. For example, the acceleration acquisition unit 10 performs acceleration detection at a predetermined sampling cycle set at a cycle shorter than a period of one rotation of the tire 3, and outputs a detection result as the detection signal. Although the detection signal of the acceleration acquisition unit 10 may be represented as an output voltage or an output current, the detection signal is exemplified to be the output voltage in the present embodiment as an example.

The control unit 11 corresponds to a first control unit, is composed of a microcomputer equipped with a CPU, ROM, RAM, I/O, etc., and executes the above-mentioned processes according to a program stored in the ROM or the like. The control unit 11 is configured to include a feature amount extraction part 11a, a feature amount storage part 11b, a change determination part 11*c*, a vehicle speed estimation part 11*d*, and an algorithm switching part 11*e* as functional units for performing these processes.

The feature amount extraction part 11*a* uses the detection signal output by the acceleration acquisition unit 10 as a detection signal representing vibration data in a tire tangential direction, and processes this detection signal to extract the feature amount of the tire vibration. In the present embodiment, the control unit 11 performs a signal processing on the detection signal of the acceleration of the tire 3 (hereinafter referred to as a tire G), and extracts the feature amount of the tire G. Further, the feature amount extraction part 11*a* transmits the data including the extracted feature amount to the data communication unit 12 as road surface data via the change determination part 11*c*. Details of the feature amount will be described later.

The feature amount storage part 11*b* stores the feature amount (hereinafter, referred to as an immediately previous feature amount) extracted by the feature amount extraction part 11*a* before one rotation of the tire 3. Whether or not the tire 3 has made one rotation can be confirmed by a method described later. Therefore, every time the tire 3 makes one rotation, the feature amount for one rotation is stored. Regarding the feature amount for one rotation of the tire 3, the data may be updated every time the tire 3 makes one rotation, or the data for a plurality of rotations may be stored and the oldest data may be deleted each time the tire 3 makes one rotation. However, from the viewpoint of saving the memory of the control unit 11 in the tire 3, it is preferable to reduce the amount of data to be stored. Therefore, it is preferable to update the data every time the tire 3 rotates.

The change determination part 11*c* is configured to determine whether or not there is a change in the road surface condition and transmit the road surface data to the data communication unit. Specifically, the change determination part 11*c* can switch the algorithm between the case where the presence or absence of the change in the road surface condition is determined and the case where the determination is not made, and the algorithm is switched by transmitting the switching instruction signal from the algorithm switching part 11*e*.

If an instruction signal is a "determination instruction signal" indicating a case where the presence or absence of the change in the road surface condition is determined, the change determination part 11*c* determines whether or not the road surface condition has changed. Regarding the presence or absence of the change in the road surface condition, the change determination part 11*c* determines based on the feature amount (hereinafter referred to as a present feature amount) extracted by the feature amount extraction part 11*a* during the present rotation of the tire 3 and the immediately previous feature amount of the tire 3 stored in the feature amount storage part 11*b*. The details of the above mentioned determination will be described later. Then, when it is determined that the road surface condition has changed, the road surface data is transmitted to the data communication unit 12. Further, if it is determined that the road surface condition has not changed, the road surface data is not transmitted to the data communication unit 12.

Further, if an instruction signal is a "non-determination instruction signal" indicating a case where the presence or absence of a change in the road surface condition is not determined, the change determination part 11*c* does not determine whether or not the road surface condition has changed, and transmits the road surface data to the data communication unit 12. In this case, every time the road surface data is transmitted from the feature amount extraction part 11*a*, the road surface data is transmitted from the change determination part 11*c* to the data communication unit 12, but the power consumption due to the determination of the presence or absence of the change in the road surface condition is eliminated.

The vehicle speed estimation part 11*d* estimates the vehicle speed in the vehicle on which the tire device 100 is mounted. Here, the vehicle speed estimation part 11*d* estimates the vehicle speed based on the detection signal of the acceleration acquisition unit 10. For example, the detection signal of the acceleration acquisition unit 10 indicates an output voltage waveform shown in FIG. 5, which will be described later, when the tire 3 makes one rotation. Therefore, the change in the output voltage waveform of the acceleration acquisition unit 10 is regarded as one rotation of the tire 3, and the time taken to generate the change is the time for one rotation of the tire 3. Therefore, the vehicle speed can be estimated from a circumference of the tire 3 and the time for one rotation of the tire 3.

The algorithm switching part 11*e* switches between the case where the change determination part 11*c* determines whether or not there is the change in the road surface condition and the case where the change determination part 11*c* does not determine based on the vehicle speed estimation result by the vehicle speed estimation part 11*d*. That is, in the tire side device 1, road surface data can be obtained every time the tire 3 makes one rotation, but if the road surface data is output every time the tire 3 makes one rotation, the power consumption required for data transmission becomes large. Then, since the road surface data is mainly required in the vehicle body side system 2 when the road surface condition changes, when the change determination part 11*c* determines that the road surface condition has changed, the road surface data may be transmitted to the vehicle body side system 2.

However, power consumption also occurs to determine the presence or absence of a change in the road surface condition. Further, it may be possible to reduce the power consumption by transmitting the road surface data from the tire side device 1 to the vehicle body side system 2 rather than determining whether or not there is a change in the road surface condition.

For example, in order to determine whether or not there is a change in the road surface condition, a program for determining whether or not there is a change in the road surface condition keeps running during the period during which the tire 3 makes one rotation, or during a required part of the period during which the tire 3 makes one rotation. Therefore, the longer an activation period of the program for changing the road surface condition during one rotation of the tire, the greater the power consumption required to determine the change in the road surface condition when the tire 3 makes one rotation. In that case, the power consumption required to determine the change in the road surface condition when the tire 3 makes one rotation may be larger than the power consumption required to transmit the road surface data from the tire side device 1 to the vehicle body side system 2 every time the tire 3 makes one rotation.

In such a case, the power consumption can be reduced by transmitting the road surface data every time the tire 3 makes one rotation without giving priority to determining whether or not there is the change in the road surface condition. Therefore, the algorithm switching part 11*e* stores a determination threshold value in which the power consumption is smaller when determining the presence or absence of a change in the road surface condition than when not determining it. Therefore, the algorithm switching instruction is issued based on whether or not it is larger than the determination threshold value.

Figure 4:
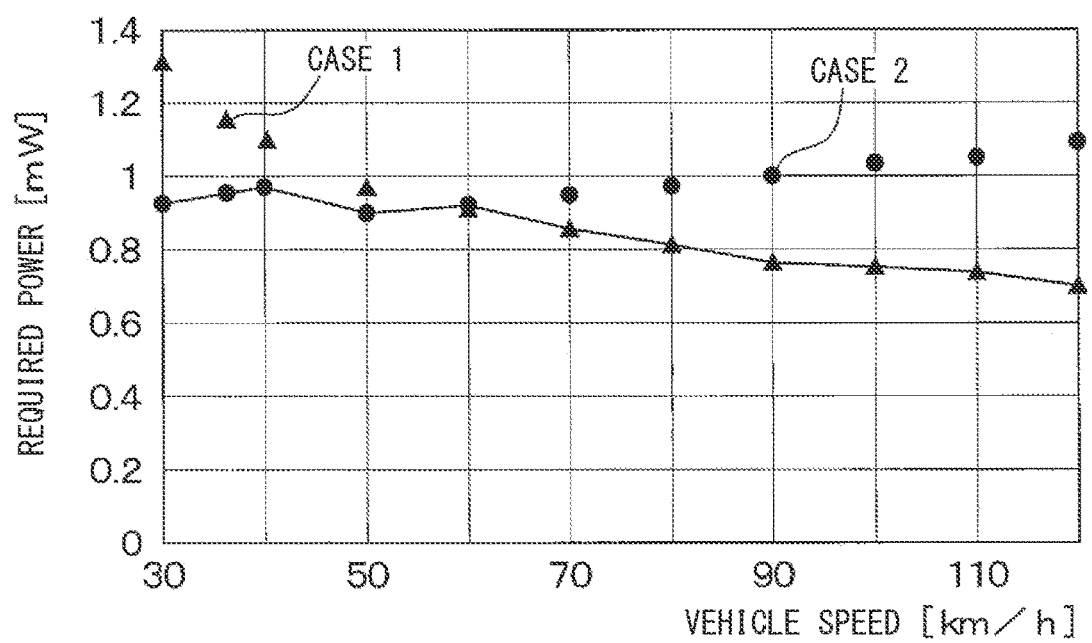
FIG. 4 is a graph showing a result of investigating the required power when a road surface data is transmitted only when a road surface condition is changed and when the road surface data is transmitted every time the tire makes one rotation without determining whether or not the road surface condition is changed.

The required power when the road surface data is transmitted only when the road surface condition changes while determining whether or not there is the change in the road surface condition (hereinafter referred to as a case 1), and the required power when the road surface data was transmitted every time the tire 3 made one rotation without determining whether or not the road surface condition was changed (hereinafter referred to as a case 2) were investigated. Specifically, a simulation was performed by changing the vehicle speed on a road surface in which the road surface condition was changed every 100 m. FIG. 4 is a diagram showing the results.

In this simulation model, when the vehicle speed is 60 km/h, the required powers of case 1 and case 2 become equal, and when the vehicle speed is less than 60 km/h, the required power of case 2 is smaller than that of case 1, and when it exceeds 60 km/h, the required power of case 1 is smaller than that of case 2. From this simulation, it can be seen that the power consumption varies depending on the cases, as described above. Therefore, in the case of this simulation model, for example, the vehicle speed is set to 60 km/h as a determination threshold value. Then, if the vehicle speed is equal to or less than the determination threshold value, the algorithm is such that the road surface data is transmitted every time the tire 3 makes one rotation without determining whether or not the road surface condition has changed, and when the vehicle speed exceeds the determination threshold value, the algorithm may be such that the road surface data is transmitted only when the road surface condition has changed. When such switching is performed, it is possible to suppress the required power to a small level as shown by the solid line in FIG. 4.

When the vehicle speed is around 60 km/h, the difference in required power between Case 1 and Case 2 is small. Therefore, the determination threshold value does not necessarily have to be set to 60 km/h at which the power consumptions of Case 1 and Case 2 are equal, and may be set to any vehicle speed before or after 60 km/h. Further, since the vehicle speed at which the required powers of Case 1 and Case 2 are equal differs depending on various conditions such as the vehicle type, for example, it is experimentally obtained for each vehicle type, and the vehicle speed in the vicinity thereof may be stored in the algorithm switching part 11e as the determination threshold value.

The data communication unit 12 is a part constituting a transmission unit. For example, when the road surface data is transmitted from the change determination part 11c, the road surface data including the present feature amount is transmitted at that timing. The timing of data transmission from the data communication unit 12 is determined based on the instruction signal from the algorithm switching part 11e. That is, when the vehicle speed is equal to or less than the determination threshold value, the road surface data is transmitted every time the tire 3 makes one rotation, and when the vehicle speed exceeds the determination threshold value, the road surface data is transmitted only when the road surface condition changes.

On the other hand, as shown in FIG. 2, the receiver 21 has a configuration including the data communication unit 24 and the control unit 25.

The data communication unit 24 is a part constituting the reception unit, and plays a role of receiving the road surface data including the present feature amount transmitted from the data communication unit 12 of the tire side device 1 and transmitting it to the control unit 25.

The control unit 25 corresponds to a second control unit, is configured by a microcomputer equipped with a CPU, ROM, RAM, I/O, etc., and performs various processes according to a program stored in the ROM or the like. The control unit 25 includes a support vector storage part 25a and a state determination part 25b as functional parts for performing various processes.

The support vector storage part 25a stores and saves the support vector for each type of road surface. The support vector is a feature amount serving as a model, and is acquired, for example, by learning using a support vector machine. The support vector is acquired by experimentally driving a vehicle equipped with the tire side device 1 on each type of road surface. During the experimental driving, the feature amount extracted by the feature amount extraction part 11 is learned for a predetermined number of tire rotations, and a predetermined number of typical feature amounts are extracted from the learned data. The support vector is the predetermined number of typical feature amounts. For example, the feature amounts are learned for one million rotations for each type of road surface, and a typical feature amount for one hundred rotations is extracted from the learned values as the support vector.

The state determination part 25b compares the present feature amount sent from the tire side device 1 received by the data communication unit 24 with the support vector for each type of road surface stored in the support vector storage part 25a, and determines the road surface state. For example, the present feature amount is compared with the support vector for each type of road surface, and the road surface of the support vector having the closest present feature amount is determined as the current traveling road surface.

When the control unit 25 determines the road surface condition in this way, the control unit 25 transmits the determined road surface condition to the notification device 23, and if necessary, the notification device 23 transmits the road surface condition to the driver. Thus, the driver tries to drive the vehicle in a manner matching the road surface condition and it is possible for driver to avoid potential danger to the vehicle. For example, the determined road surface state may be displayed always by the notification device 23 or the road surface state may be displayed to warn the driver only when the vehicle need be driven more carefully than usual, for example, when the determined road surface state corresponds to a wet road or a frozen road. The road surface state is transmitted from the receiver 21 to an ECU such as the brake ECU 22, which performs vehicle motion control, so that the vehicle motion control is performed based on the transmitted road surface state.

The brake ECU 22 is configured as a brake control device that performs various brake controls. Specifically, the brake ECU 22 controls a braking force by increasing or decreasing a wheel cylinder pressure by driving an actuator, which controls a brake fluid pressure. In addition, the brake ECU 22 independently controls the braking force of each road wheel. When the road surface state is transmitted from the receiver 21, the brake ECU 22 controls the braking force as the vehicle motion control based on the transmitted road surface state. For example, when the transmitted road surface state indicates a frozen road, the brake ECU 22 weakens the braking force generated in response to the amount of brake operation by the driver, as compared with a dry road surface. Thereby, wheel slip can be suppressed, and danger of the vehicle can be avoided.

The notification device 23 is configured with a meter display device, for example, and used to notify the driver of the road surface state. In case that the notification device 23 is configured with the meter display device, it is located at a position which the driver is capable of easy recognition during driving of the vehicle, for example, within an instrument panel in the vehicle. When the road surface state is transmitted from the receiver 21, the meter display device visually notifies the driver of the road surface state by performing display in such a manner that the state of the road surface can be grasped.

The notification device 23 may alternatively be configured as a buzzer or a voice guidance device. In such a case, the notification device 23 notifies the driver of the road surface state audibly by buzzer sound or voice guidance. Although the meter display device is exemplified as the notification device 23 providing visual notification, the notification device 23 may be configured as a display device that displays information such as a head up display.

The tire device 100 is configured as described above in the present embodiment. Each unit forming the vehicle body side system 2 is connected through an in-vehicle LAN (Local Area Network) like CAN (Controller Area Network) communication. Therefore, each unit can communicate information with each other through the in-vehicle LAN.

Next, a description will be given of details of the feature quantities extracted by the feature amount extraction part 11*a* described above and of the determination of a change in the road surface condition by the change determination part 11*c*.

First, the feature amount extracted by the feature amount extraction part 11*a* will be described. The feature amount referred to here is a quantity indicating the feature of the vibration applied to the tire 3 acquired by the acceleration acquisition unit 10, and is represented as, for example, a feature vector.

Figure 5:
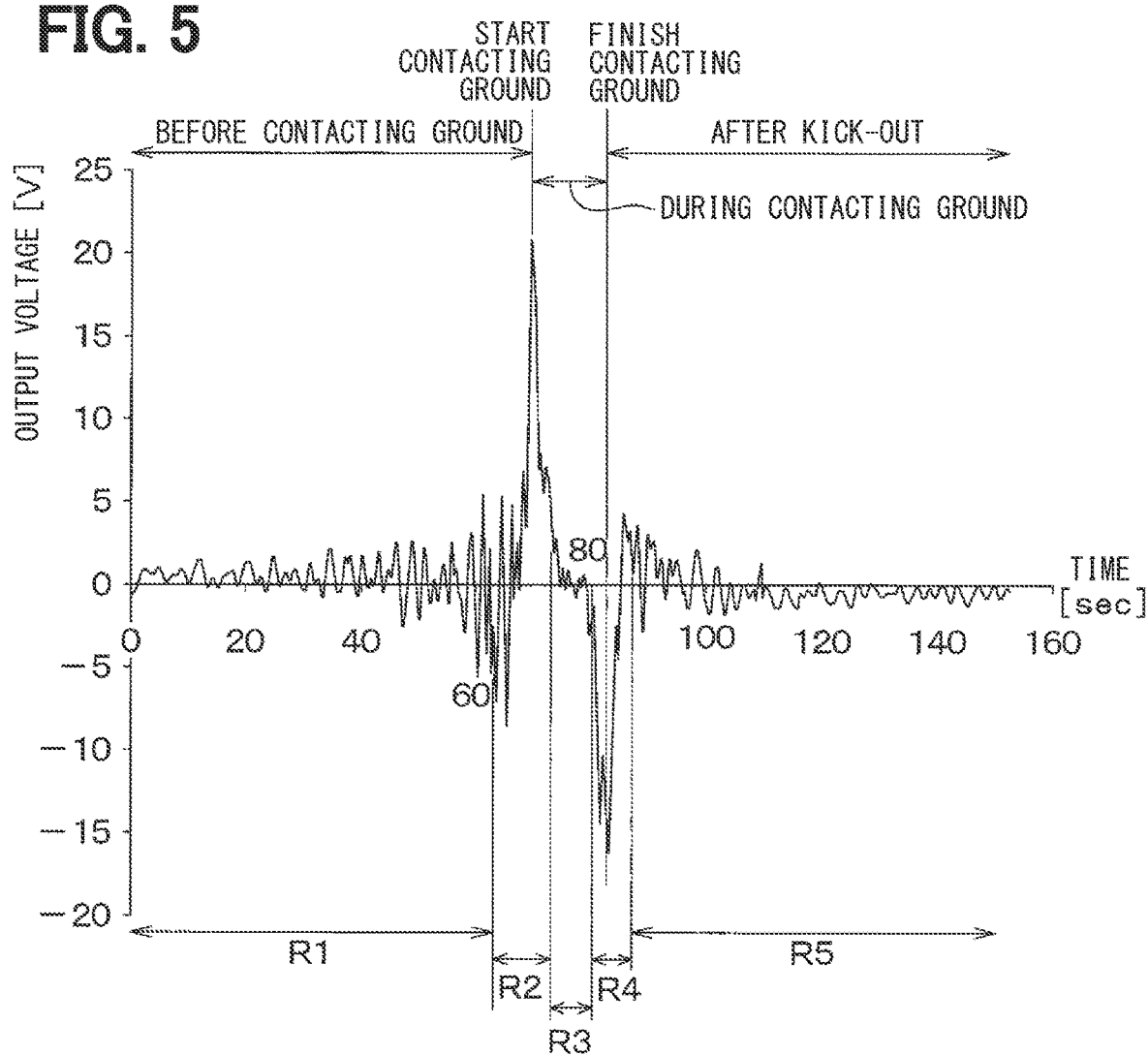
FIG. 5 is a waveform chart of an output voltage from an acceleration acquisition unit during tire rotation.

The output voltage waveform of the detection signal of the acceleration acquisition unit 10 when the tire is rotating is, for example, the waveform shown in FIG. 5. As shown in FIG. 5, the output voltage of the acceleration acquisition unit 10 has a maximum value at the contact start time when the portion of the tread 31 of the tire 3 corresponding to the position of the acceleration acquisition unit 10 starts to contact the ground with the rotation of the tire 3. Hereinafter, the peak value at the start of grounding at which the output voltage of the acceleration acquisition unit 10 takes a maximum value is referred to as a first peak value. As shown in FIG. 5, the output voltage of the acceleration acquisition unit 10 has a minimum value at the contact end time when the portion of the tread 31 of the tire 3 corresponding to the position of the acceleration acquisition unit 10 is changed from a state contacting the ground to a state not contacting the ground with the rotation of the tire 3. Hereinafter, the peak value at the end of grounding where the output voltage of the acceleration acquisition unit 10 takes a minimum value is referred to as a second peak value.

The reason why the output voltage of the acceleration acquisition unit 10 has peak values at the above timing is as follows. When the portion of the tread 31 corresponding to the position of the acceleration acquisition unit 10 contacts the ground with the rotation of the tire 3, a portion of the tire 3, which had a substantially cylindrical surface, is pressed to be deformed into a flat shape in the vicinity of the acceleration acquisition unit 10. Upon receiving the impact at this time, the output voltage of the acceleration acquisition unit 10 has the first peak value. When the portion of the tread 31 corresponding to the position of the acceleration acquisition unit 10 is separated from the ground with the rotation of the tire 3, the pressing of the portion of the tire 3 is released in the vicinity of the acceleration acquisition unit 10, and the flat shape of the portion of the tire 3 returns to the substantially cylindrical shape. Upon receiving the impact when the shape of the tire 3 returns, the output voltage of the acceleration acquisition unit 10 has the second peak value. In this way, the output voltage of the acceleration acquisition unit 10 has the first peak value and the second peak value at the contact start time and the contact end time, respectively. Since a direction of impact when the tire 3 is pressed and a direction of impact when the tire 3 is released from pressurization are opposite, polarities of the output voltages are also opposite.

Here, the moment at which the portion of the tread 31 corresponding to the arrangement location of the acceleration acquisition unit 10 contacts the road surface is referred to as a step-in region, and the moment at which the tread 31 leaves the road surface is referred to as a kick-out region. The "step-in region" includes a timing when the first peak value is reached, and the "kick-out region" includes a timing when the second peak value is reached. In addition, a region before the step-in region is referred to as a "pre-step-in region", a region from the step-in region to the kick-out region, that is, a region where the tread 31 corresponding to the location of the acceleration acquisition unit 10 is in contact with the ground, is referred to as a "pre-kick-out region", and a region after the kick-out region is referred to as a "post-kick-out region". In this manner, the period in which the portion of the tread 31 corresponding to the location of the acceleration acquisition unit 10 is in contact with the ground and before and after that portion can be divided into five regions. In FIG. 5, the pre-step-in region, the step-in region, the pre-kick-out region, the kick-out region and the post-kick-out region of the detection signal are indicated as five zones R1 to R5 in sequence, respectively.

The vibration generated in the tire 3 varies in each of the divided regions according to the road surface condition, and the detection signal of the acceleration acquisition unit 10 changes correspondingly. Therefore, by analyzing the frequency of the detection signal of the acceleration acquisition unit 10 in each region, the road surface condition of the vehicle on the road surface is detected. For example, in a slippy road surface condition such as a snow-covered road, the shearing force at the time of kicking out decreases, so that a band value selected from 1 kHz to 4 kHz band becomes small in the kick-out region R4 and the post-kick-out region R5. Since each frequency component of the detection signal of the acceleration acquisition unit 10 changes according to the road surface condition, it is possible to determine the road surface condition based on the frequency analysis of the detection signal.

Figure 6:
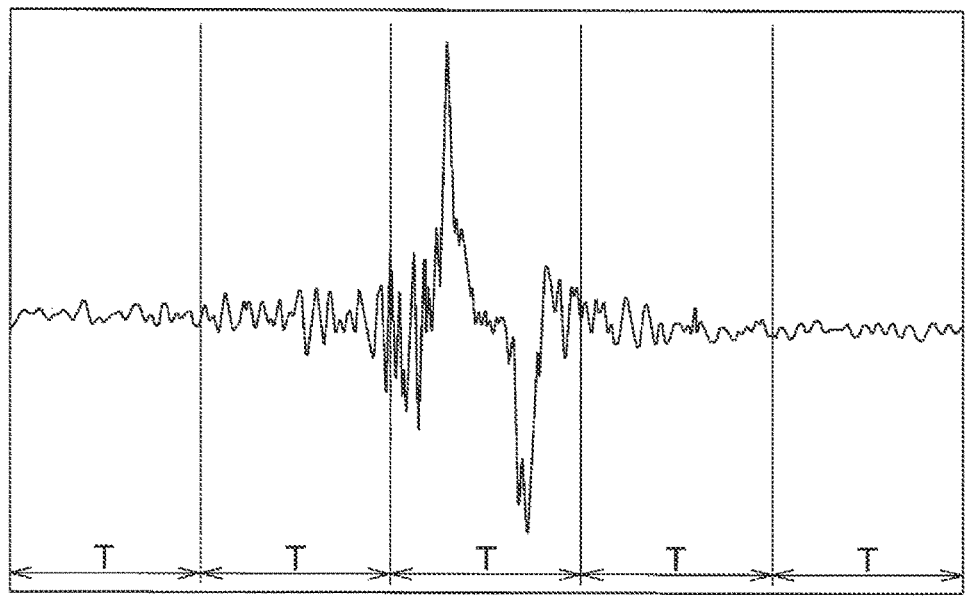
FIG. 6 is a waveform chart illustrating a detection signal from the acceleration acquisition unit which is segmented by each of time windows having a predetermined time width T.

Therefore, the feature amount extraction part 11*a* divides the detection signal of the acceleration acquisition unit 10 for one rotation of the tire 3, which has a continuous time axis waveform, into a plurality of sections each having a predetermined time width T as shown in FIG. 6, performs the frequency analysis in each section, and extracts the feature amount. Specifically, by performing the frequency analysis in each section, the feature amount extraction part 11*a* calculates a power spectrum value in each frequency band, that is, a vibration level in a specific frequency band, and this power spectrum value is used as a feature amount.

The number of sections divided by the time window of the time width T is a value that varies with the vehicle speed, more specifically, with the rotation speed of the tire 3. In the following description, the number of sections for one rotation of the tire 3 is assumed to be "n" (where "n" is a natural number).

For example, the feature amount is calculated as the power spectrum value, which is acquired by passing the detection signal of each section through a plurality of filters of a specific frequency band, for example, five band-pass filters of 0 to 1 kHz, 1 to 2 kHz, 2 to 3 kHz, 3 to 4 kHz and 4 to 5 kHz. This feature amount is called a characteristic vector, and the characteristic vector Xi of a section i (where i is a natural number of 1≤i≤n) is expressed as a matrix having power spectrum values of each specific frequency band as elements as shown in the following equation. The power spectrum value of each specific frequency band is indicated by aik.

$$X_i = \begin{bmatrix} a_{i1} \\ a_{i2} \\ a_{i3} \\ a_{i4} \\ a_{i5} \end{bmatrix} \quad \text{[Equation 1]}$$

"K" of the power spectrum value $a_{ik}$ is the number of the specific frequency bands, that is, the number of the band-pass filters. In case that the frequency band of 0 to 5 kHz is divided into five sections as exemplified above, "k" is 1 to 5. A determinant X that comprehensively represents the characteristic vectors X1 to Xn of all the sections 1 to n is as follows.

$$X = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix} \quad \text{[Equation 2]}$$

This determinant X is an equation representing the feature amount of one rotation of the tire. The feature amount extraction part 11a extracts the feature amount represented by the determinant X by frequency-analyzing the detection signal of the acceleration acquisition unit 10.

Subsequently, a description will be given of determination of a change in the road surface condition, which is performed by the change determination part 11c. The determination is made by calculating a degree of similarity using the present feature amount extracted by the feature amount extraction part 11a and the immediately previous feature amount stored in the feature amount storage part 11b.

Regarding the determinant X representing the feature amount as described above, the determinant of the present feature amount is expressed as X (r), the determinant of the feature amount of immediately previous time is expressed as X (r−1), and a power spectrum value $a_{ik}$ as each element of the determinants is expressed as a(r)ik and a(r−1)ik. In this case, the determinant X(r) of the present feature amount and the determinant X(r−1) of the feature amount of the immediately previous time are expressed as follows, respectively.

$$X(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix} \quad \text{[Equation 3]}$$

$$X(r-1) = \begin{pmatrix} a(r-1)_{11} & a(r-1)_{21} & \ldots & a(r-1)_{n1} \\ a(r-1)_{12} & a(r-1)_{22} & \ldots & a(r-1)_{n2} \\ a(r-1)_{13} & a(r-1)_{23} & \ldots & a(r-1)_{n3} \\ a(r-1)_{14} & a(r-1)_{24} & \ldots & a(r-1)_{n4} \\ a(r-1)_{15} & a(r-1)_{25} & \ldots & a(r-1)_{n5} \end{pmatrix} \quad \text{[Equation 4]}$$

A degree of similarity indicates the degree of similarity between the feature amounts represented by the two determinants, and the degree of similarity means that the higher the degree of similarity, the more similar it is. In the case of the present embodiment, the change determination part 11c calculates the degree of similarity using the kernel method, and determines the change in the road surface condition based on the degree of similarity. Here, an inner product of the determinant X(r) at the time of the present rotation of the tire 3 and the determinant X(r−1) one rotation before, that is, a distance between coordinates indicated by the characteristic vectors Xi of the individual sections divided for each time window of the predetermined time width T in a characteristic space, is calculated and used as the degree of similarity.

Figure 7:
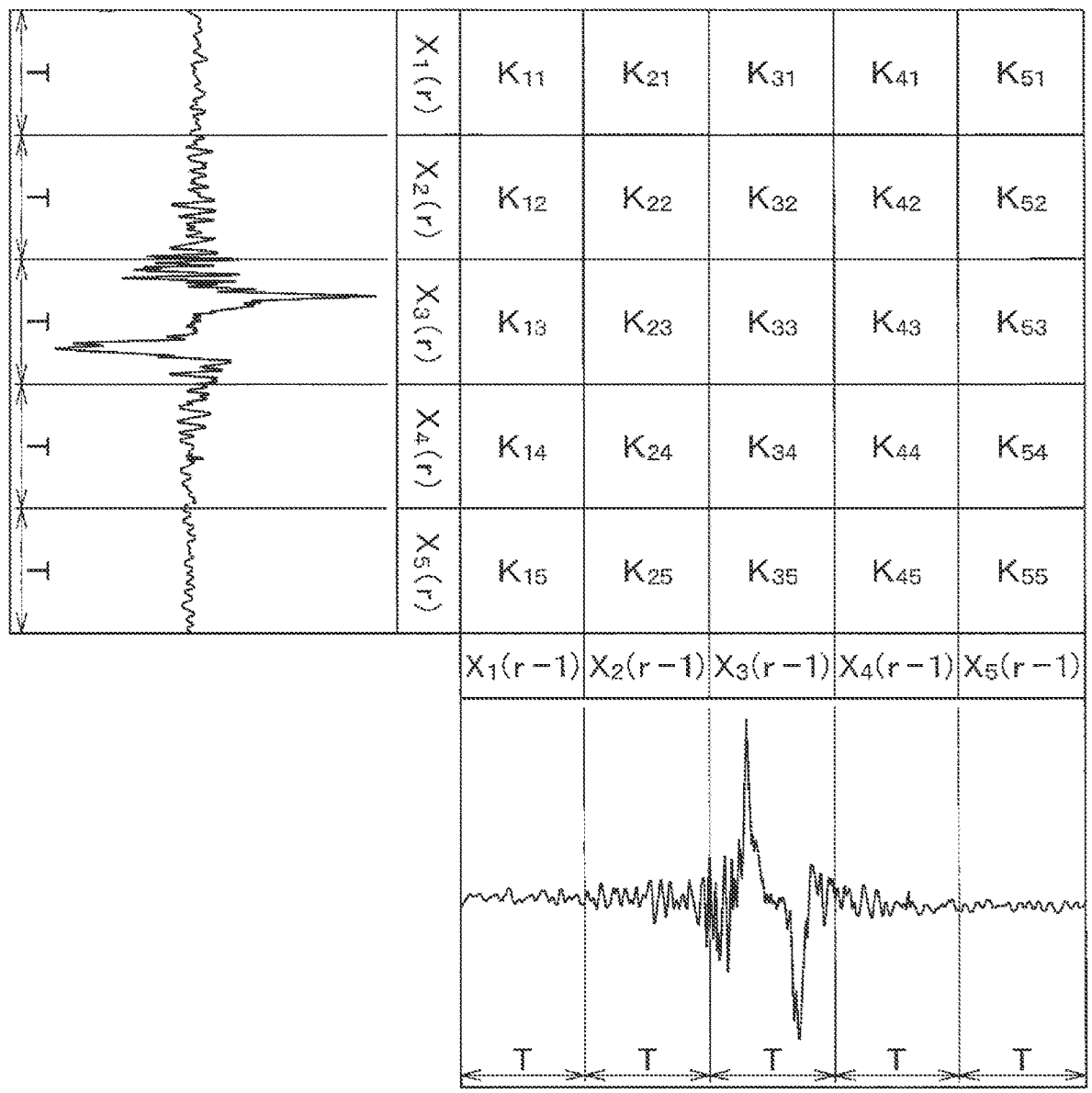
FIG. 7 is a graph illustrating relationships between determinants $Xi(r)$ and $Xi(r-1)$ and a distance $Kyz$ in each of segments resulting from segmentation of a time axis waveform during a present rotation of the tire and a time axis waveform during an immediately previous rotation of the tire by each of the time windows having the predetermined time width T.

For example, as shown in FIG. 7, regarding a time axis waveform of the detection signal of the acceleration acquisition unit 10, each of the time axis waveform at the time of the present rotation of the tire 3 and the time axis waveform at the time of one rotation before is divided into each section by a time window set to a predetermined time width T. In the illustrated example, since each time axis waveform is divided into five sections, "n" is 5, and "i" is represented by 1≤i≤5. Here, as shown in the figure, the feature vector Xi of each section at the time of present rotation is Xi(r), and the feature vector of each section at the time of one rotation before is Xi(r−1). In this case, regarding the distance Kyz between the coordinates indicated by the feature vector Xi of each section, it is shown like a cell where a horizontal cell including the feature vector Xi(r) of each section at the time of present rotation of the tire 3 and a vertical cell containing the feature vector Xi(r−1) at the time of one rotation before. As for the distance Kyz, "y" is obtained by rewriting "i" in Xi(r−1), and "z" is obtained by rewriting "i" in Xi(r). In addition, since there is no significant change in vehicle speed between the present rotation and one rotation before, the number of sections at each rotation is basically the same.

In case of the present embodiment, the feature vectors are acquired by dividing into five specific frequency bands. Therefore, the feature vector Xi of each section is represented in the six-dimensional space combined with the time axis, and the distance between the coordinates indicated by the feature vectors Xi of the individual sections is the distance between the coordinates in the six-dimensional space. However, the distance between the coordinates indicated by the feature vector of each section is smaller and larger as the feature amounts are more similar and less similar, respectively. Therefore, the degree of similarity becomes higher as the distance becomes smaller, and the degree of similarity becomes lower as the distance becomes larger.

For example, in case the sections 1 to n are provided by time division, the distances Kyz between the coordinates represented by the feature vectors in the individual sections 1 is expressed by the following equation.

$$Kyz = \sqrt{\{a(r)_{11} - a(r-1)_{11}\}^2 + \{a(r)_{12} - a(r-1)_{12}\}^2 + \ldots \{a(r)_{15} - a(r-1)_{15}\}^2}$$

[Equation 5]

In this way, the distance Kyz between the coordinates indicated by the feature vectors of the individual sections by time division is acquired for all the sections, a total sum Ktotal of the distances Kyz of all sections is calculated, and this total Ktotal is used as a value corresponding to the degree of similarity. Then, the total sum Ktotal is compared with a predetermined threshold Th, and if the total sum Ktotal is larger than the threshold Th, it is determined that the degree of similarity is low and there is a change in the road surface condition, and if the total sum Ktotal is smaller than the threshold Th, it is determined that the degree of similarity is high and there is no change in the road surface condition.

Here, the total sum Ktotal of the distances Kyz between the two coordinates indicated by the feature vectors of the respective sections is used as the value corresponding to the degree of similarity. However, another parameter indicating the degree of similarity may be used. For example, as a parameter indicating the degree of similarity, an average distance Kave, which is an average value of the distance Kyz obtained by dividing the total sum Ktotal by the number of sections, can be used. It is also possible to obtain the degree of similarity using various kernel functions. Instead of using all of the feature vectors, the degree of similarity may be calculated by excluding a path having a low degree of similarity from the feature vectors.

Subsequently, a description will be given of an operation of the tire device 100 according to the present embodiment with reference to FIG. 8.

Figure 8:
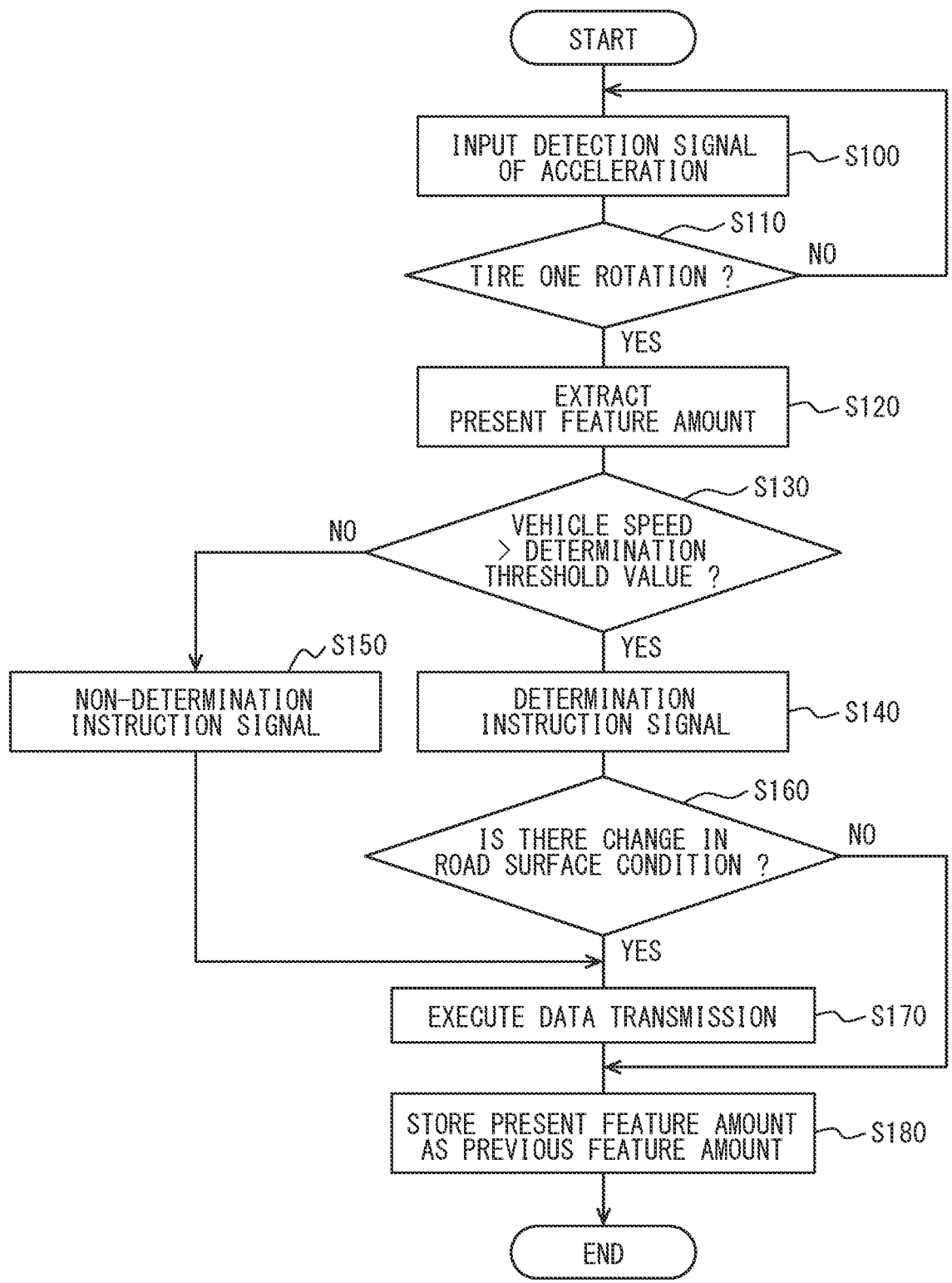
FIG. 8 is a flow chart of a data transmission process to be performed by a control unit of the tire side device.

In the tire side device 1 of each wheel, the control unit 11 executes a data transmission process shown in FIG. 8. This process is executed at predetermined control cycles.

First, in step S100, a detection signal input process of the acceleration acquisition unit 10 is performed. This process is continued for a period until the tire 3 makes one rotation in the subsequent step S110. Then, when the detection signal of the acceleration acquisition unit 10 is input for one rotation of the tire, the process proceeds to the subsequent step S120, and the feature amount of the time axis waveform of the detection signal of the acceleration acquisition unit 10 for the input one rotation of the tire is extracted. The processes in the above steps S100 to S120 are performed by the feature amount extraction part 11a.

The fact that the tire 3 has made one rotation is determined based on the time axis waveform of the detection signal of the acceleration acquisition unit 10. That is, since the detection signal draws the time axis waveform shown in FIG. 5, one rotation of the tire 3 can be determined by checking the first peak value and the second peak value of the detection signal. Further, the vehicle speed can be obtained from the time required for one rotation of the tire 3.

The road surface state especially appears as a change in the time axis waveform of the detection signal during the period before and after including "step-in region", "pre-kick-out region", and "kick-out region". Therefore, it is sufficient that the data during this period is input, and it is not always necessary to input all the data of the detection signals of the acceleration acquisition unit 10 during one rotation of the tire. For example, for the date in the "pre-step-in region" and the "post-kick-out region", it is sufficient that there is data in the vicinity of the "step-in region" or the "kick-out region". Therefore, in the region where the vibration level of the detection signal of the acceleration acquisition unit 10 is smaller than the threshold value, the detection signal may not input as a period during which the road surface state is not easily affected even in the "pre-step-in region" and "post-kick-out region".

The extraction of the feature amount performed in step S120 is performed exactly in accordance with the method described above.

After that, the process proceeds to step S130, and it is determined whether or not the vehicle speed exceeds the determination threshold value. If an affirmative determination is made here, the process proceeds to step S140 and a "determination instruction signal" is output in order to determine whether or not there is a change in the road surface condition and transmit the road surface data only when the road surface condition changes. Further, if a negative determination is made here, the process proceeds to step S150 and a "non-determination instruction signal" is output so that the road surface data is transmitted every time the tire 3 makes one rotation without determining whether or not there is a change in the road surface condition. The processes of steps S130 to S150 are performed by the algorithm switching part 11e.

Then, when the "determination instruction signal" is output in step S140, the process proceeds to step S160, and the degree of similarity is obtained by the above-mentioned method based on the present feature amount and the immediately previous feature amount, and for example, by comparing the degree of similarity with the threshold value Th, it is determined whether or not there is a change in the road surface condition. This process is executed by the change determination part 11c, and is executed based on the present feature amount extracted by the feature amount extraction part 11a and the immediately previous feature amount stored in the feature amount storage part 11b in step S180 described later.

Then, if an affirmative determination is made in step S160, the change determination part 11c transmits the road surface data including the present feature amount to the data communication unit 12 in order to execute the data transmission in step S170. As a result, the data communication unit 12 transmits the road surface data including the present feature amount. In this way, the road surface data including the present feature amount is transmitted from the data communication unit 12 only when there is a change in the road surface condition, and the data is not transmitted when there is no change in the road surface condition. Therefore, it is possible to decrease communication frequency, and it is possible to achieve in saving power consumption of the control unit 11 in the tire 3.

On the other hand, even when the "non-determination instruction signal" is output in step S150, the process proceeds to step S170. The change determination part 11c transmits the road surface data including the present feature amount to the data communication unit 12 in order to execute the data transmission. In this case, the road surface data is transmitted every time the tire 3 makes one rotation without determining whether or not the road surface condition has changed.

Finally, the process proceeds to step S180, and the present feature amount is stored in the feature amount storage part 11b as the immediately previous feature amount, and the process is completed.

Figure 9:
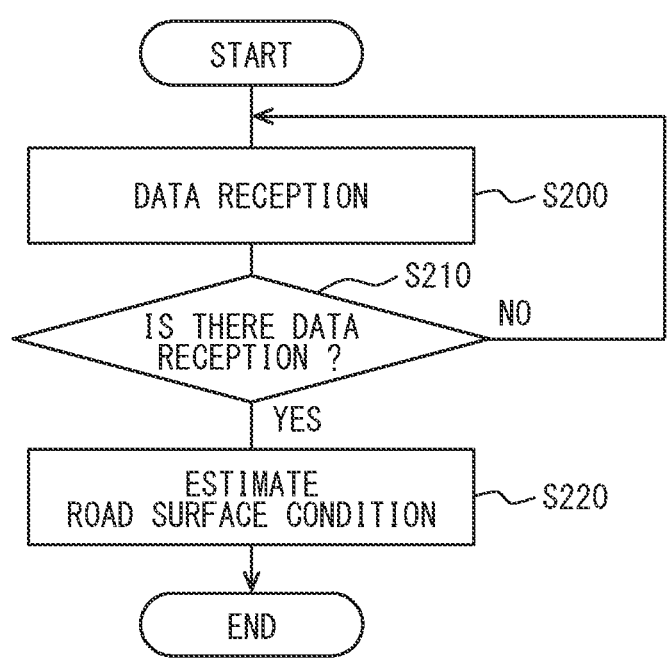
FIG. 9 is a flowchart of a road surface condition determination process performed by the vehicle body side system.

On the other hand, in the receiver 21, the control unit 25 performs the road surface condition determination process shown in FIG. 9. This process is executed at predetermined control cycles.

First, in step S200, data reception process is performed. When the data communication unit 24 receives the road surface data, the control unit 25 obtains the road surface data, so that this process is performed. When the data communication unit 24 does not perform the data reception, the control unit 25 ends this process without obtaining any road surface data.

The process then proceeds to S210 and determines whether data is received. If data is received, the process proceeds to S220. If no data is received, the process in steps S200 and S210 is repeated until data is received.

Then, the process proceeds to step S220 to determine the road surface condition. The road surface condition is determined by comparing the present feature amount included in the received road surface data with the support vector for each type of road surface stored in the support vector storage part 25a. For example, the degree of similarity between the present feature amount and all the support vectors for each type of road surface is obtained, and the road surface of the support vector with the highest degree of similarity is determined to be the current traveling road surface. Regarding the calculation of the degree of similarity at this time, the same method in step S160 of FIG. 8 as the calculation of the degree of similarity between the present feature amount and the immediately previous feature amount may be used.

As described above, the tire device 100 according to the present embodiment can determine the road surface condition of the traveling road surface of the vehicle. When determining the road surface condition in this way, if the vehicle speed exceeds the determination threshold value, the road surface data including the present feature amount is transmitted from the tire side device 1 only when the road surface condition is changed. Therefore, it is possible to decrease communication frequency, and it is possible to achieve in saving power consumption of the control unit 11 in the tire 3. Further, when the vehicle speed is equal to or less than the determination threshold value, it is not determined whether or not the road surface condition is changed, and the road surface data is transmitted every time the tire 3 makes one rotation. As a result, when the vehicle speed is equal to or less than the determination threshold value, the road surface data is frequently transmitted to the vehicle body side system 2, and the power saving is realized as compared with the case where the road surface data is transmitted only when the road surface condition changes.

In addition, in the tire device 100, the control unit 11 of the tire side device 1 need not include the support vector storage part for storing the support vectors. Accordingly, it is also possible to save a memory storage capacity for the control unit 11 in the tire 3.

Further, the data process of calculating the degree of similarity by the control unit 11 of the tire side device 1 may be performed appropriately only with respect to the present feature amount and the immediately previous feature amount, and the calculation of the degree of similarity between the present feature amount and all the support vectors may be performed in the vehicle body side system 2. Therefore, it is possible to further reduce the amount of memory consumed by the control unit 11 in the tire 3, and it is possible to realize memory saving.

Therefore, it is possible to provide the tire side device 1 which can save the memory storage capacity and power for the control unit 11 in the tire 3 and the tire device 100 including the tire side device 1.

Other Embodiments

Although the present disclosure has been described in accordance with the above-described embodiments, the present disclosure is not limited to the above-described embodiments, and encompasses various modifications and variations within the scope of equivalents. In addition, while various combinations and configurations, which are preferred, other combinations and configurations including further only a single element, more or less, are also within the spirit and scope of the present disclosure.

For example, the feature amount storage part 11b stores the feature amount before one rotation as the feature amount at the time of the past rotation of the tire 3, but it is not always necessary to store only the feature amount before one rotation. That is, the immediately previous amount is not limited to being stored in the feature amount storage part 11b as the feature amount during the past rotation of the tire 3 (hereinafter referred to as a past feature amount). However, the feature amount before a plurality of rotations may be stored as a past feature amount, or an average value of the past feature amounts for a plurality of rotations may be stored. Then, in the calculation of the degree of similarity with the immediately previous feature amount, the immediately previous feature amount of the past feature amount may be used, or the average value of a plurality of past feature amounts including the immediately previous feature amount may be used. However, from the viewpoint of memory saving, it is preferable to store as few feature amounts as possible.

Also, in each of the embodiments described above, the case where the vibration detection unit is formed of the acceleration acquisition unit 10 is shown by way of example. However, the vibration detection unit can also be formed of another element capable of detecting vibration such as, e.g., a piezoelectric element.

Further, when the road surface condition changes, the tire side device 1 transmits the road surface data including the present feature amount, but the immediately previous feature amount may also be included in the road surface data. In that case, the vehicle body side system 2 can also determine the road surface condition before the change by comparing the immediately previous feature amount with the support vector. Therefore, it is possible to discriminate both the road surface condition before and after the change and to recognize the change in the road surface condition more accurately.

Further, in the above embodiment, the control unit 25 of the receiver 21 provided in the vehicle body side system 2 obtains the degree of similarity between the present feature amount and the support vector, and determines the road surface condition. However, this configuration is also only an example, and the control unit of another ECU, for example, the brake ECU 22 may obtain the degree of similarity, or determined the road surface condition.

Further, in the above embodiment, when the vehicle speed is equal to or lower than the determination threshold value, the road surface data is transmitted every time the tire 3 makes one rotation, but this configuration is also only an example. That is, when the vehicle speed is equal to or less than the determination threshold value, determining whether or not there is a change in the road surface condition is a cause of the increase in power consumption. Therefore, if the road surface data should be transmitted without making this determination, the transmission interval can be arbitrarily set. For example, the road surface data may be transmitted once or a plurality of times each time the tire 3 makes a plurality of rotations.

Further, in the present embodiment, the vehicle speed estimation part 11d estimates the vehicle speed based on the detection signal of the acceleration acquisition unit 10. However, this embodiment is also only an example. It is possible to enable bidirectional communication in which data can be transmitted from the vehicle body side system 2 to the tire side device 1, to transmit data related to the vehicle speed from the vehicle body side system 2, and to estimate the vehicle speed estimation part 11d based on the data.

The control unit and the method thereof described in the present disclosure are realized by a dedicated computer provided by configuring a processor and a memory programmed to execute one or more functions embodied by a computer program. May be done. Alternatively, the control unit and the method described in the present disclosure may be implemented by a special purpose computer configured as a processor with one or more special purpose hardware logic circuits. Alternatively, the control unit and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

What is claimed is:

1. A tire side device that is attached to a tire provided in a vehicle and is used in a tire device configured to determine a road surface condition of a traveling road surface of the vehicle, the tire side device, comprising:
    a vibration detection unit configured to output a detection signal corresponding to a magnitude of vibration of the tire;
    a control unit having a feature amount extraction part configured to extract a feature amount of the detection signal during one rotation of the tire; and
    a transmission unit configured to transmit a road surface data including the feature amount extracted by the feature amount extraction part, wherein
    the control unit includes
        a feature amount storage part configured to store the feature amount in a past extracted by the feature amount extraction part as a previous feature amount,
        a change determination part configured to determine whether or not there is a change in the road surface condition based on a present feature amount and the previous feature amount stored in the feature amount storage part, when the feature amount extracted at a time of a present rotation of the tire by the feature amount extraction part is referred to a present feature amount, and transmit the road surface data including the present feature amount by the transmission unit when there is a change in the road surface condition,
        a vehicle speed estimation part configured to estimate a vehicle speed of the vehicle, and
        an algorithm switching part configured to transmit the road surface data from the transmission unit when the change determination part determines that the road surface condition is changed when the vehicle speed estimated by the vehicle speed estimation part is less than a determination threshold value, and to transmit the road surface data without determining whether or not the road surface condition is changed by the change determination part when the vehicle speed estimated by the vehicle speed estimation part is equal to or greater than the determination threshold value.

2. The tire side device according to claim 1, wherein the algorithm switching part
    stores the determination threshold value,
    causes to transmit the road surface data without determining whether or not the road surface condition is changed by the change determination part when the vehicle speed is equal to or lower than the determination threshold value,
    determines whether or not the road surface condition is changed by the change determination part when the vehicle speed exceeds the determination threshold value, and
    causes the transmission unit to transmit the road surface data when the change determination part determines that the road surface condition is changed.

3. The tire side device according to claim 2, wherein the algorithm switching part stores, as the determination threshold value, a vehicle speed at which a required power for determining whether or not the road surface condition is changed by the change determination part for each rotation of the tire and a required power for transmitting the road surface data without determining whether or not the road surface condition is changed by the change determination part are equal to each other.

4. The tire side device according to claim 1, wherein the change determination part calculates a degree of similarity between the present feature amount and the previous feature amount, and determines that the road surface condition is changed based on the degree of similarity.

5. The tire side device according to claim 1, wherein the feature amount extracted by the feature amount extraction part is represented by a feature vector of a time axis waveform of the detection signal.

6. A road surface determination device, comprising:
    the tire side device according to claim 1, in which the control unit is a first control unit, and
    a vehicle body side system including a reception unit configured to receive the road surface data including the present feature amount sent from the transmission unit and a second control unit configured to determine the road surface condition based on the road surface data received by the reception unit, wherein
    the second control unit includes a support vector storage part in which support vectors for the feature amount are stored for each type of the road surface condition and a state determination part which determines the road surface condition based on the present feature amount included in the road surface data and on the support vectors stored in the support vector storage part.

7. A tire side device that is attached to a tire provided in a vehicle and is used in a tire device configured to determine a road surface condition of a traveling road surface of the vehicle, the tire side device, comprising:
    a vibration detector configured to output a detection signal corresponding to a magnitude of vibration of the tire;

a controller configured to extract a feature amount of the detection signal during one rotation of the tire; and a transmitter configured to transmit a road surface data including the feature amount extracted by a feature amount extraction part, wherein the controller includes a computer including a processor and a memory that stores instructions configured to, when executed by the processor, cause the processor to store the feature amount in a past as a previous feature amount, determine whether or not there is a change in the road surface condition based on a present feature amount and the previous feature amount, when the feature amount extracted at a time of a present rotation of the tire is referred to a present feature amount, and transmit the road surface data including the present feature amount by the transmitter when there is a change in the road surface condition, estimate a vehicle speed of the vehicle, and transmit the road surface data from the transmitter when the road surface condition is changed when the vehicle speed estimated is less than a determination threshold value, and transmit the road surface data without determining whether or not the road surface condition is changed when the vehicle speed estimated is equal to or greater than the determination threshold value.

8. The tire side device according to claim 7, wherein
the computer causes the processor to
store the determination threshold value,
transmit the road surface data without determining whether or not the road surface condition is changed when the vehicle speed is equal to or lower than the determination threshold value,
determine whether or not the road surface condition is changed when the vehicle speed exceeds the determination threshold value, and
transmit the road surface data by the transmitter when the road surface condition is changed.

9. The tire side device according to claim 8, wherein
the computer causes the processor to store, as the determination threshold value, a vehicle speed at which a required power for determining whether or not the road surface condition is changed for each rotation of the tire and a required power for transmitting the road surface data without determining whether or not the road surface condition is changed are equal to each other.

10. The tire side device according to claim 7, wherein
the computer causes the processor to calculate a degree of similarity between the present feature amount and the previous feature amount, and determine that the road surface condition is changed based on the degree of similarity.

11. The tire side device according to claim 7, wherein
the feature amount is represented by a feature vector of a time axis waveform of the detection signal.

12. The tire side device according to claim 1, wherein
the determination threshold value is determined based on a comparison of required powers of a first case, transmitting the road surface data from the transmission unit when the change determination part determines that the road surface condition is changed and a second case, transmitting the road surface data without determining whether the road surface condition is changed by the change determination part.

13. The tire side device according to claim 7, wherein
the determination threshold value is determined based on a comparison of required powers of a first case, transmitting the road surface data from the transmitter when the road surface condition has changed and a second case, transmitting the road surface data without determining whether the road surface condition has changed.

* * * * *